United States Patent [19]

Mendoza et al.

[11] Patent Number: 5,766,506
[45] Date of Patent: Jun. 16, 1998

[54] HARD WATER COMPATIBLE PHOSPHATE-CONTAINING HEAT TRANSFER FLUIDS

[75] Inventors: Abel Mendoza, Midland, Mich.; Mark E. Ogle, Grayslake, Ill.

[73] Assignee: The Dow Chemical Company, Midland, Mich.

[21] Appl. No.: 712,816

[22] Filed: Sep. 12, 1996

[51] Int. Cl.$^6$ .................... C09K 5/00; C02F 5/10
[52] U.S. Cl. .................... 252/76; 252/75; 252/79; 252/180; 252/181; 210/698; 210/701
[58] Field of Search .................. 252/76, 79, 75, 252/180, 181; 210/701, 698

[56] References Cited

U.S. PATENT DOCUMENTS

| | | | |
|---|---|---|---|
| 2,783,200 | 2/1957 | Crum et al. | 210/23 |
| 3,793,222 | 2/1974 | Haschke et al. | 252/180 |
| 3,928,196 | 12/1975 | Persinski et al. | 210/58 |
| 3,948,792 | 4/1976 | Watsen et al. | 252/181 |
| 3,956,121 | 5/1976 | Haschke et al. | 210/53 |
| 3,992,343 | 11/1976 | Haschke et al. | 260/29.6 |
| 4,029,577 | 6/1977 | Godlewski et al. | 210/58 |
| 4,217,216 | 8/1980 | Lipinski | 251/181 |
| 4,253,968 | 3/1981 | Eastman | 210/698 |
| 4,277,379 | 7/1981 | Hermann et al. | 252/608 |
| 4,324,664 | 4/1982 | Snyder et al. | 210/701 |
| 4,326,980 | 4/1982 | Snyder et al. | 252/180 |
| 4,387,027 | 6/1983 | May et al. | 210/697 |
| 4,389,324 | 6/1983 | Keller | 210/701 |
| 4,487,712 | 12/1984 | Wilson et al. | 252/78.3 |
| 4,566,973 | 1/1986 | Masler, III et al. | 210/701 |
| 4,647,381 | 3/1987 | Fong | 210/701 |
| 4,711,725 | 12/1987 | Amick et al. | 210/701 |
| 4,711,735 | 12/1987 | Gulley | 252/75 |
| 4,952,327 | 8/1990 | Amjad et al. | 210/701 |
| 5,064,552 | 11/1991 | Oppenlaender et al. | 252/78.3 |
| 5,076,951 | 12/1991 | Miles et al. | 252/79 |
| 5,078,879 | 1/1992 | Gill et al. | 210/701 |
| 5,118,434 | 6/1992 | Meyer et al. | 252/70 |
| 5,290,467 | 3/1994 | Turcotte et al. | 252/76 |
| 5,290,468 | 3/1994 | Turcotte et al. | 252/76 |
| 5,330,670 | 7/1994 | Turcotte et al. | 252/76 |
| 5,454,967 | 10/1995 | Pfitzner et al. | 252/78.5 |
| 5,643,493 | 7/1997 | Connor et al. | 252/75 |

FOREIGN PATENT DOCUMENTS

| | | |
|---|---|---|
| 0 340 529 A1 | 4/1989 | European Pat. Off. . |
| 6-4688 | 1/1994 | Japan . |

Primary Examiner—Christine Skane

[57] ABSTRACT

A heat transfer fluid is disclosed which comprises a glycol, a phosphate, and a copolymer additive which is a copolymer of an ethylenically substituted carboxylic acid and an aldehyde. A method for preparing the heat transfer fluid comprises admixing 92 to 96 weight percent of one or more glycols; 2 to 4 weight percent of a phosphate; and 0.01 to 0.25 weight percent of the copolymer additive. Precipitation of phosphate salts is inhibited in phosphate-containing glycol-based fluids by the addition of the copolymer additive before mixing the fluid with water.

19 Claims, No Drawings

HARD WATER COMPATIBLE PHOSPHATE-CONTAINING HEAT TRANSFER FLUIDS

BACKGROUND OF THE INVENTION

1. Field of the Invention

This invention relates to glycol-based heat transfer fluids, and more specifically to glycol based heat transfer fluids comprising polyaldehydocarboxylic acids (POC).

2. Description of the Prior Art

Typically, glycol-based heat transfer fluids are sold at nearly one-hundred percent glycol content. The fluids can then be diluted, as needed, with water. However, glycol-based heat transfer fluids containing phosphates are typically incompatible with hard water because calcium and magnesium ions, normally present in hard water, react with phosphates to form insoluble precipitates. The solid precipitates create fouling and decrease the heat transfer efficiency of the system. Because these heat transfer fluids are normally used as a 30% or 50% solution in water, high purity water is typically needed to dilute the heat transfer fluids without problematic precipitation.

Additives have been used to inhibit such precipitation. For example, U.S. Pat. No. 5,290,468 to Turcotte describes a polycarboxylate-containing coolant additive for use in hard water applications which prevents hard water precipitants. The preferred class of these coolant additives is described to be based on polyacrylic acid and/or polymaleic acid.

Also, U.S. Pat. No. 5,188,434 to Meyer describes glycol-based compositions useful as antifreeze fluids in heat-transfer applications or as deicing fluids for aircraft. Although the compositions described in Meyer inhibit the precipitation of salts when the composition is admixed with water, other important problems with heat transfer fluids include, for example, hydrolytic stability and corrosion. With respect to corrosion, Meyer requires the use of corrosion inhibitors in the fluid.

Regarding hydrolytic stability, a hydrolytically stable fluid has stable functional groups in aqueous solutions. Meyer describes co- and ter-polymers of acrylic acid and amides, esters, or sulfonates. Additives containing functional groups such as esters or amides typically hydrolyze over time at high pH or if subjected to high temperatures over long periods of time. The hydrolytic stability of the Meyer fluid may be acceptable at the relatively low temperatures in its application as deicing fluid, but stability is decreased when a fluid is used as a heat transfer fluid where temperatures can reach up to about 140° C.

Therefore, despite the description of fluid additives which prevent precipitation in some applications, phosphate-containing glycol fluids which are compatible with hard water and which are both hydrolytically stable and provide acceptable corrosion properties would be beneficial to producers and consumers of these glycol-based fluids.

SUMMARY OF THE INVENTION

The present invention is a hard water compatible, phosphate-containing heat transfer fluid and a method of making and using the same. It has been discovered that the formation of phosphate scale or hard water precipitates is inhibited by the addition of sufficient amounts of a particular copolymer additive to phosphate-containing heat transfer fluids. The copolymer additive comprises an ethylenically substituted carboxylic acid or alkali metal salt thereof and at least one aldehyde. This class of additives allows the heat transfer fluids to be diluted economically with tap water rather than with purified water. Further, these additives are soluble in most glycol fluids, are hydrolytically stable to high pH and high temperature, prevent the precipitation of most solids even in the presence of high levels (>2%) of phosphate, are compatible with most additives normally used in coolants, and provide acceptable corrosion properties in many applications. In addition to ethylene glycol-based fluids, these copolymer additives may also be employed in propylene glycol-based fluids.

The heat transfer fluid of the present invention comprises a glycol, a phosphate, and a copolymer of (a) an ethylenically substituted carboxylic acid or alkali metal salt thereof and (b) at least one aldehyde. These heat transfer fluids can be used alone or in combination with other additives, such as polycarboxylates, phosphonates, or aminophosphonates. Optionally, these heat transfer fluids may contain corrosion inhibitors other than phosphate.

Another embodiment of the present invention is a method for preparing the heat transfer fluid. The method comprises admixing 90 to 96 weight percent of one or more glycols; 1 to 4 weight percent of a phosphate; and 0.01 to 0.25 weight percent of a copolymer of an ethylenically substituted carboxylic acid or alkali metal salt thereof and at least one aldehyde. The phosphate and copolymer may be added to the fluid as aqueous solutions.

A further embodiment of the present invention is a method for inhibiting the precipitation of phosphates in glycol-based compositions when contacted with water. The method comprises adding about 100 to 2500 parts of a polymeric additive per million parts by weight of the glycol-based composition prior to contacting the glycol-bases composition with water. The polymeric additive comprises a copolymer of (a) an ethylenically substituted carboxylic acid or alkali metal salt thereof and (b) at least one aldehyde.

DETAILED DESCRIPTION OF THE INVENTION

One embodiment of the present invention is a heat transfer fluid comprising a glycol, a phosphate, and a copolymer comprising an ethylenically substituted carboxylic acid or alkali metal salt thereof and at least one aldehyde.

The copolymer is preferably essentially free of cross-linking. A copolymer is defined as an elastomer produced by the simultaneous polymerization of two or more dissimilar monomers. Cross-linking is defined as the attachment of two chains of polymer molecules by bridges composed of either an element, a group, or a compound which join certain carbon atoms of the chains by primary chemical bonds. (Hawley's Condensed Chemical Dictionary, 323 (Sax and Lewis re. 11th ed. 1987).)

The molecular weight of the copolymer is preferably less than about 5,000 grams/mole. Copolymers of higher molecular weight may not be soluble in some glycol-based solutions, especially propylene glycol-based solutions. The molecular weight of the copolymer is preferably greater than about 2,000 grams/mole. Copolymers having molecular weights less than about 2,000 grams/mole generally do not perform as well in heat transfer applications.

The copolymers used as additives in the present invention are understood to encompass those water-soluble polymers having at least one monomeric unit containing an ethylenically substituted carboxylic acid or alkali metal salt thereof and at least one monomeric unit containing an aldehyde. The monomer units may be arranged in random sequence. The mean frequency of these units is preferably such as to provide a molar ratio of ethylenically substituted carboxylic acid or alkali metal salt thereof to aldehyde of about 10:1 to 1:10; more preferably, 3:1 to 1:1; and most preferably, about 2:1. Particularly preferred is a molar ratio of acrylic acid-:aldehyde (acrolein) of about 2:1.

With respect to the ethylenically substituted carboxylic acid, suitable monocarboxylic acids include, for example, acrylic acid, methacrylic acid, ethacrylic acid, vinylacetic acid, allylacetic acid and crotonic acid. Suitable monoethylenically unsaturated C4–C6 dicarboxylic acids include, for example, maleic acid, itaconic acid, citraconic acid, mesaconic acid, fumaric acid, and methylenemalonic acid. The ethylenically substituted carboxylic acid is preferably acrylic acid, or methacrylic acid, or alklali metal salts thereof; most preferably, acrylic acid or alkali metal salts thereof.

Acrylic acids preferably employed as ethylenically substituted carboxylic acid in the present invention comprise units of the general formula $CH_2=C(R1)COOA$, and may include a minor amount of vinyl groups attached in side chains or units of the general formula $—(R)(COOA)C—C(R)(COOA)—$. In these formulae, A is hydrogen or a valence of a mono or polyvalent metal, particularly an alkali metal and, preferably, sodium. R and R1 may be the same or different and are alkyl of 1–6 carbon atoms, particularly methyl. Acids having additional carbon atoms may undesirably change the characteristics of the polymer.

Acrylic acid monomer may include any mixture of acrylic acids. Similarly, aldehyde monomer may include any mixture of aldehydes, such that any combination of acrylic acids and aldehydes may provide suitable copolymer additives.

The aldehyde monomer may include any unsaturated aldehyde having up to about 10 carbon atoms. Examples of suitable aldehydes include cinnamaldehyde, acrolein, and methacrolein. Aldehydes with greater than 10 carbon atoms may undesirably change the steric character of the polymer. Preferably, the aldehyde monomer is a C11–C6 aldehyde. Most preferably, the aldehyde monomer is acrolein.

The copolymer is preferably a polyaldehydocarboxylic acid (POC), which is a copolymer of acrylic acid and acrolein or an alkali metal salt thereof. Other suitable copolymers may include copolymers of methacrylic acid and methacrolein.

In addition to the ethylenically substituted carboxylic acid monomer and aldehyde monomer required to be in the copolymer, additional organic substituents may be used as comonomers or as modifiers added along the polymer chain, provided such additional substituents do not undesirably change the characteristics of the resulting polymer. Such additional monomers may include, for example, allylic alcohols.

Further, the heat transfer fluid of the present invention can be employed alone or in combination with other materials such as phosphonates or chelants. Exemplary chelants may include polyamino carboxylates such as ethylenediaminetetra-acetic acid (EDTA). The use of additional additives in combination with the copolymer described herein may provide better properties than the copolymer additive alone. For example, Table 1 shows the addition of phosphonate, such as BAYHIBIT AM, provides a synergistic benefit on the turbidity of the solution. Therefore, aminophosphonates are preferred as supplemental fluid additives. These supplemental additives are preferably employed in about the same molar amount as the original copolymer additive.

Copolymers which may be used in the present invention may be prepared as is known in the literature. (See, for example, U.S. Pat. No. 3,956,121 to Haschke, column 5, line 44 to column 7, line 11, herein incorporated by reference.) Other copolymers useful in the present invention may be prepared by similar polymerization methods known in the art.

The monomers can be polymerized in unneutralized form, in the partial neutralized form, or completely neutralized form. Any such neutralization is preferably achieved by treatment with a strong base, especially with an alkali metal hydroxide, a reaction well known in the art. Preferably, the alkali metal comprises sodium.

The copolymer is preferably present in an amount of greater than about 0.01 weight percent of the heat transfer fluid. If the copolymer is present in a less than about 0.01%, then phosphate precipitation may occur. The copolymer is preferably present in an amount of less than about 0.25 weight percent of the heat transfer fluid. Greater concentrations increase the cost of manufacturing the fluid.

The glycols which can be used in the present invention typically comprise: alkylene glycols, alkylene glycol monoethers, alkylene glycol diethers, or mixtures thereof. Examples of these types of glycols are listed in U.S. Pat. No. 5,118,434 to Meyer, column 2, lines 42–55 which is herein incorporated by reference. Preferably the glycols comprise at least about 90 percent by weight of the fluid, more preferably, at least about 92 weight percent. Preferably the glycols comprise less than about 98 percent by weight of the fluid, more preferably, less than about 96 weight percent. While ethylene glycol is preferred in the present invention, propylene glycol or mixtures of ethylene glycol and propylene glycol may be employed. Antifreeze/coolant compositions are well-known in the art and many variations of such glycol based compositions may be useful in the present invention.

The phosphates employed are usually in the form of an alkali metal salt. Preferably the phosphate comprises at least about 1 percent by weight of the composition; more preferably, at least about 2 weight percent. Preferably the phosphate comprises less than about 4 percent by weight of the fluid, more preferably, less than about 3 weight percent of the fluid. The composition preferably comprises between about 100 to 2500 parts of the copolymer per million parts by weight of the glycol fluid.

Another embodiment of the present invention is a method for preparing a heat transfer fluid. The method comprises admixing: 92 to 96 weight percent of one or more glycols; 2 to 4 weight percent of a phosphate; and 0.01 to 0.25 weight percent of a copolymer of an ethylenically substituted carboxylic acid or alkali metal salt thereof and at least one aldehyde. In general, the copolymer additive is added to the fluid in an amount sufficient to inhibit phosphate precipitation. The mixture is stirred until a homogenous solution is obtained. Typically, about thirty minutes to about two hours is sufficient mixing time. The phosphate and copolymer may be added as aqueous solutions.

Typically, the fluid further comprises water when utilized in heat transfer applications. This may be achieved by a method for preparing a heat transfer fluid and further admixing the heat transfer fluid with water to form a mixture containing between about 40 and 75 weight percent water.

Another embodiment of the present invention is a method for inhibiting the precipitation of phosphates in glycol-based compositions when contacted with water. The method comprises adding about 100 to 2500 parts of a polymeric additive per million parts by weight of the glycol-based composition prior to contacting the glycol-based composition with water; the polymeric additive comprises a copolymer of an ethylenically substituted carboxylic acid or alkali metal salt thereof and at least one aldehyde. Any of these glycols listed above in combination with a phosphate may be referred to as a glycol-based composition.

For better corrosion resistance, the fluid used in the above method, preferably has a pH of between about 8 and 10. In addition, corrosion inhibitors may optionally be added to the fluid. Representative corrosion inhibitors include sodium silicate, sodium nitrite, sodium nitrate, sodium molybdate, sodium benzoate and sodium borate; salts of other alkali metals, such as potassium, may also be used.

Additives with sulfonate groups, such as AQUATREAT MPS, may also inhibit the precipitation of phosphate and may be used in combination with the POC additives of the present invention, as indicated by data in Table 1. Polyacrylic acids (i.e. several acrylic acid polymers) were tested in comparison to the POCs of the present invention. The POCs of the present invention provide better performance than polyacrylic acids for thermal stability and reserve alkalinity, as indicated by the data in Table 4.

EXAMPLE

Several additives were evaluated at various concentrations with each of the following heat transfer fluids: DOWTHERM* SR1, DOWTHERM* 4000, and DOWFROST* HD. (* DOWFROST and DOWTHERM are trademarks of The Dow Chemical Company.) Each additive was added to a fluid in the amount indicated and the mixture was stirred until a homogeneous solution was obtained. In a similar manner, one of the additives (POC HS 2020) was tested with a few commercial antifreeze coolants. Some additives did not completely dissolve in the fluid concentrate, but dissolved completely upon dilution with water. Each fluid containing additive was diluted with water of various hardness levels; the turbidity of each solution was measured one day later. Some solutions were cloudy or had a precipitate and, therefore, failed the turbidity test.
Additives evaluated BELCLENE 400 copolymer: a telomer of acrylic acid with sodium 2-acrylamido-2-methyl-1-propanesulfonate and sodium phosphinate, of MW >4,000, supplied by FMC as a 50% aqueous solution with a pH of 2.1–2.7.

ACUMER 1000 polyacrylate: a partial sodium salt (20% neutralized, ~6.0% Na) of an acrylic acid polymer of MW 2,000, supplied by Rohm and Haas as a 48% aqueous solution, with a pH of 3.6.

ACUSOL 445N sodium polyacrylate: a sodium salt (fully neutralized) of an acrylic acid polymer of MW 4,500, supplied by Rohm and Haas as a 45% aqueous solution, with a pH of 7.0.

GOOD-RITE K-752 polyacrylate: a partial sodium salt (0.8% Na ion) of an acrylic acid polymer of MW 2,100, supplied by B.F Goodrich as a 63% aqueous solution, with a pH of 2.6.

GOOD-RITE K-7600N sodium polyacrylate: a sodium salt of an acrylic acid polymer of MW 60,000, supplied by B.F Goodrich as a 33% aqueous solution, with a pH of 8.2.

AQUATREAT MPS polyacrylate-sulfonate: a sodium salt of an acrylic acid copolymer with allyloxide benzene sulfonate, supplied by Alco as a 40% aqueous solution.

POC AS 2020 sodium polyaldehydo carboxylate: a sodium salt of a copolymer of acrylic acid and acrolein, of MW <5,000, containing 69 mole % C02-functionality, supplied by Degussa as a solid, or a 50% aqueous solution with a pH of 6.5.

POC AS 5060 sodium polyaldehydo carboxylate: a sodium salt of a copolymer of acrylic acid and acrolein, of MW 5,000, containing 81 mole % C02-functionality, supplied by Degussa as a solid, or a 40% aqueous solution with a pH of 6.5.

POC HS 2020 polyaldehydo carboxylic acid: a copolymer of acrylic acid and acrolein, of MW <5,000, containing 69 mole % CO2H functionality, supplied by Degussa as a 50% aqueous solution with a pH of 1.0.

POC HS 5060 polyaldehydo carboxylic acid: a copolymer of acrylic acid and acrolein, of MW 5,000, containing 81 mole % CO2H functionality, supplied by Degussa as a 40% aqueous solution with a pH of 1.0.

BAYHIBIT AM phosphonate: 2-phosphonobutane-1,2,4-tricarboxylic acid (PBTC), supplied by Miles as a 50% aqueous solution with a pH of 1.1.

Preparation of hard water

Standard hard water used for dilution was prepared according to the Society of Automotive Engineers (SAE) Aerospace Materials Specification 1425B. Water containing ~340 ppm CaCO3 equivalents of hardness was prepared as follows. A 400 mg portion of calcium acetate hydrate and 280 mg of MgSO4.7H2O was dissolved in 1 L of ASTM D 1193, Type IV water (deionized or distilled). This water, pared has 91 mg of Ca and 28 mg of Mg, which corresponds to ~340 ppm CaCO3 equivalents, and is considered very hard water according to the U.S Geological Service. The amount of Ca and Mg ions may be represented as CaCO3 equivalents using the formulas from ASTM D 511-92:

$$\text{Calcium as CaCO3, mg/L} = \text{mg/L Ca} \times 2.50$$

$$\text{Magnesium as CaCO3, mg/L} = \text{mg/L Mg} \times 4.12$$

Water with other hardness levels was also prepared by changing the amounts of calcium acetate monohydrate and MgSO4.7H2O as follows:

| Approximate ppm CaCO$_3$ equivalents | mg Ca salt | mg Mg salt | Corresponding mg Ca | Corresponding mg Mg |
|---|---|---|---|---|
| 55 | 67 | 47 | 14 | 5 |
| 110 | 133 | 93 | 30 | 9 |
| 220 | 267 | 187 | 61 | 18 |
| 450 | 533 | 373 | 121 | 37 |
| 570 | 670 | 470 | 152 | 46 |

Table 1 below shows turbidity results for samples of DOWTHERM* 4000 fluid which were prepared containing 700 ppm active additive concentration. Each sample was diluted to 30% concentration (v/v) with water containing various levels of hardness. The turbidities were measured, and visual inspection was made for cloudiness and scale precipitation.

Clear solutions were obtained for most of the samples up to 340 ppm hardness levels. Fluids were also prepared containing 350 ppm of a polyaldehydocarboxylate (POC) and 350 ppm of another additive such as a carboxylic acid or an phosphonate. Again, clear solutions were obtained most of the samples up to about 340 ppm hardness levels. Examples of

TABLE 1

TURBIDITIES OF REFORMULATED DOWTHERM* 4000,
Nephelometric Turbidity Units (NTU)
700 ppm Total Additive Concentration

| Aditive | soln. | Conc. 30% solutions; H₂O hardness | | | | | |
|---|---|---|---|---|---|---|---|
| | | 0 | 110 | 220 | 340 | 450 | 570 |
| None | 13.7 | 19.5 | 27.2 | 36.9 | 44.9 | 52.4 | 63.8 |
| Acumer 1000 | 14.2 | 19.5 | 19.7 | 20.5 | 22.9 | 28.8 | 34.7 |
| POC HS 2020 | 13.6 | 18.4 | 18.7 | 19.6 | 22.9 | 28.9 | 34.2 |
| Acumer 1000/POC HS 2020 | 12.8 | 16.8 | 17.2 | 19.1 | 21.2 | 25.9 | 36.6 |
| Acumer 1000 | 14.2 | 19.5 | 19.7 | 20.5 | 22.9 | 28.8 | 34.7 |
| POC AS 2020 | 14.5 | 18.4 | 18.9 | 21.0 | 23.7 | 30.4 | 36.2 |
| Acumer 1000/POC AS 2020 | 12.6 | 17.2 | 17.6 | 18.9 | 22.1 | 29.0 | 40.2 |
| Good-Rite K-752 | 14.1 | 18.9 | 18.9 | 19.7 | 22.7 | 28.2 | 32.2 |
| POC HS 2020 | 13.6 | 18.4 | 18.7 | 19.6 | 22.9 | 28.9 | 34.2 |
| Good-Rite K-752/POC HS 2020 | 12.7 | 17.1 | 17.2 | 18.9 | 21.1 | 28.2 | 36.4 |
| Good-Rite K-752 | 14.1 | 18.9 | 18.9 | 19.7 | 22.7 | 28.2 | 32.2 |
| POC AS 2020 | 14.5 | 18.4 | 18.9 | 21.0 | 23.7 | 30.4 | 36.2 |
| Good-Rite K-752/POC HS 2020 | 12.4 | 16.8 | 17.4 | 18.7 | 21.9 | 29.7 | 36.8 |
| POC HS 2020 | 13.6 | 18.4 | 18.7 | 19.6 | 22.9 | 28.9 | 34.2 |
| Bayhibit AM | 13.9 | 18.8 | 22.8 | 31.0 | 40.0 | 52.5 | 69.0 |
| POC HS 2020/ Bayhibit AM | 11.5 | 16.8 | 16.3 | 17.6 | 20.9 | 28.0 | 34.8 |
| POC HS 2020 | 13.6 | 18.4 | 18.7 | 19.6 | 22.9 | 28.9 | 34.2 |
| Aquatreat MPS | 12.8 | 18.0 | 18.7 | 19.4 | 22.5 | 26.5 | 33.9 |
| POC HS 2020/ Aquatreat MPS | 11.6 | 16.2 | 16.4 | 17.6 | 21.1 | 25.5 | 31.9 |

Note:
Solutions with NTU's >26–28 were cloudy or had a precipitate.

Table 2 shows the turbidities of commercial phosphate-containing antifreeze coolants before and after stabilization with 700 ppm of POC HS 2020. These phosphate-containing and silicate-containing coolants tolerated higher levels of hardness as a result of the presence of the POC additive.

TABLE 2

TURBIDITIES OF COMMERCIAL COOLANTS, NTU

| Coolant | soln. | Conc. 30% soutions, H₂O hardness | | | | | |
|---|---|---|---|---|---|---|---|
| | | 0 | 110 | 220 | 340 | 450 | 570 |
| ZEREX ® | 4.03 | 8.2 | 14.1 | 20.4 | 29.7 | 38.2 | 52.9 |
| ZEREX ® + 700 ppm POC HS 2020 | 4.22 | 9.55 | 9.80 | 10.3 | 10.8 | 13.2 | 26.3 |
| PRESTONE ® | 9.92 | 10.7 | 16.0 | 21.2 | 31.1 | 37.7 | 48.8 |
| PRESTONE ® + POC HS 2020 | 15.0 | 11.1 | 11.3 | 11.7 | 13.8 | 17.5 | 23.5 |
| PEAK ® | 6.03 | 9.19 | 12.6 | 12.4 | 12.8 | 14.0 | 47.5 |
| PEAK ® + POC HS 2020 | 6.70 | 8.80 | 9.24 | 9.27 | 10.3 | 13.0 | 17.7 |
| TEXACO ® | 4.10 | 8.60 | 11.9 | 15.5 | 20.5 | 28.5 | 38.1 |
| TEXACO ® + POC HS 2020 | 4.45 | 8.34 | 8.45 | 8.80 | 9.05 | 9.80 | 11.7 |

Note:
Generally, fluids with NTU higher than 12–14, and no additive, had a precipitate or some cloudiness.
ZEREX ® is a registered trademark of BASF Corp.
PEAK ® is a registered trademark of Old World Trading.
TEXACO ® is a registered trademark of Texaco Oil Company.

Tables 3 and 4 show the results of thermal stability tests. Several DOWTHERM* SR1 and DOWFROST* HD fluids containing the indicated concentrations of an additive, were subjected to thermal stability studies in carbon steel ampoules for four weeks at 400° F. (204° C.). The pH and reserve alkalinity (R.A.) of the final fluid are measures of thermal stability. Reserve alkalinity provides an amount of protection from acid. R.A. typically drops over time resulting in a more acidic solution, and acidic solutions are generally more corrosive. The reserve alkalinity is measured using ASTM method D1121. The pH of the solution is measured using ASTM method D 1287. A Brinkmann 670 Titroprocessor is used to perform these measurements.

Table 3 shows that fluids containing POC AS 2020 additive performed about as well as the original fluids to which POC AS 2020 was added. Fluids containing Acumer 1000, a polyacrylate additive, generally gave a lower pH and a lower reserve alkalinity. Also, neutralized POCs, such as POC AS 2020, typically provide better thermal stability than partially neutralized or non-neutralized POCs.

TABLE 3

THERMAL STABILITY TEST, 4 WEEKS at 400° F. (204° C.)

| FLUID | pH | R.A. |
|---|---|---|
| Properties of initial fluids: | | |
| DOWTHERM* SR1 | 9.36 | 13.6 |
| DOWTHERM* SR1 + 1,000 ppm | | |
| Acumer 1000 | 8.48 | 12.8 |
| POC HS 2020 (50% neutralized) | 8.70 | 13.1 |
| POC HS 2020 (90% neutralized) | 8.76 | 13.1 |
| POC AS 2020 (neutralized) | 9.29 | 13.6 |
| DOWTHERM* SR1 + 700 ppm | | |
| Acumer 1000 | 8.59 | 12.8 |
| POC HS 2020 (50% neutralized) | 8.54 | 12.9 |
| POC HS 2020 (90% neutralized) | 8.86 | 13.2 |
| POC AS 2029 (neutralized) | 9.27 | 13.7 |
| Properties after 4 weeks at 400° F. (204° C.): | | |
| DOWTHERM* SR1 | 8.59 | 11.4 |
| DOWTHERM* SR1 + 1,000 ppm | | |
| Acumer 1000 | 7.98 | 10.3 |
| POC HS 2020 (50% neutralized) | 7.96 | 10.3 |
| POC HS 2020 (90% neutralized) | 8.03 | 10.6 |
| POC AS 2020 (neutralized) | 8.47 | 11.4 |
| DOWTHERM* SR1 + 700 ppm | | |
| Acumer 1000 | 7.98 | 10.4 |
| POC HS 2020 (50% neutralized) | 8.19 | 10.9 |
| POC HS 2020 (90% neutralized) | 8.07 | 10.7 |
| POC AS 2020 (neutralized) | 8.33 | 11.3 |

TABLE 4

THERMAL STABILITY TEST, 4 weeks at 400° F. (204° C.)

| FLUID | pH | R.A. |
|---|---|---|
| Properties of initial fluids: | | |
| DOWFROST* HD | 10.06 | 17.7 |
| DOWFROST* HD + | | |
| POC AS 2020, 1,800 PPM | 9.91 | 18.4 |
| POC HS 2020, 1,200 PPM | 8.88 | 16.9 |
| POC HS 2020 (90% neutralized) | 9.43 | 17.6 |
| Acumer 1000, 1200 PPM | 9.09 | 17.3 |
| Acumer 1000 (90% neutralized) | 10.06 | 18.0 |
| Good-Rite K-752, 1,200 PPM | 9.01 | 17.2 |
| Good-Rite K-752 (90% neutralized) | 10.34 | 18.11 |
| Properties of fluids after 4 weeks at 400° F. (204° C.): | | |
| DOWFROST* HD | 9.06 | 13.2 |
| DOWFROST* HD + | | |
| POC AS 2020, 1,800 PPM | 8.76 | 14.2 |
| POC HS 2020, 1,200 PPM | 8.77 | 12.9 |

TABLE 4-continued

THERMAL STABILITY TEST, 4 weeks at 400° F. (204° C.)

| FLUID | pH | R.A. |
|---|---|---|
| POC HS 2020 (90% neutralized) | 8.99 | 13.1 |
| Acumer 1000, 1200PPM | 8.29 | 12.1^ |
| Acumer 1000 (90% neutralized) | 8.53 | 12.6^ |
| Good-Rite K-752, 1,200 PPM | 8.79 | 13.7 |
| Good-Rite K-752 (90% neutralized) | 9.29 | 14.0 |

^ Solution had a dark precipitate.

Table 5 shows the results of a thermal stability test similar to the test described above, but run for 10 days at 80° C. Additives listed in Table 5 with an "N" are neutralized. Surprisingly, although neutralized POCs provide better thermal stability, neutralized polyacrylic acids such as Acumer 1000-N and Good-Right K-752-N failed the 10 day turbidity test at 80° C. while their non-neutralized counterparts passed. "Fail" indicates the solution had a turbidity greater than about 10–12 NTU.

Therefore, even though additives such as polyacrylic acid may appear to provide acceptable pH and R.A., polyacrylic acid additives may result in solutions having increased turbidity over time at elevated temperatures like temperatures to which heat transfer fluids are typically subjected. Increased turbidity decreases the efficiency of a heat transfer fluid. Therefore, fluids containing POC type additives generally have better thermal stability properties than do fluids containing polyacrylic acid.

In addition, although the fluids based on unneutralized polyacrylic acid type additives passed the ten day test at 80° C., when these fluids were subjected to thermal stability studies at 400° F. (204° C.) for four weeks, some of the fluids gave low pH, low reserve alkalinity, and/or dark precipitates as indicated in Tables 3 and 4.

TABLE 5

DOWFROST* HD MODIFIED FLUIDS
10 Day Test at 80° C.
Turbidity, NTU

| | 30% Solutions, $H_2O$ Hardness | | | | |
|---|---|---|---|---|---|
| FLUID | 0 | 110 | 220 | 340 | 450 |
| DOWFROST* HD + | | | | | |
| POC AS 2020 | pass | pass | pass | pass | pass |
| POC HS 2020 | pass | pass | pass | pass | pass |
| POC HS 2020-N | pass | pass | pass | pass | pass |
| Acumer 1000 | pass | pass | pass | pass | pass |
| Acumer 1000-N | pass | fail | fail | fail | fail |
| Good-Rite K-752 | pass | pass | pass | pass | pass |
| Good-Rite K-752-N | pass | fail | fail | fail | fail |

Tables 6 and 7 show the results of corrosion studies using ASTM method D1 384. ASTM 1384 is a corrosion test method for engine coolants in glassware. The metal assembly is immersed in aerated engine coolant solutions for 336 hours at 88 C. The weight changes incurred by the specimens are measured. The test is run in triplicate and the average weight reported in mils penetration per year. The fluids containing POC AS 2020 generally showed better corrosion performance than fluids containing polyacrylic acids. Surprisingly, when the polyacrylic acid additive (Good-Rite K-752) was neutralized with potassium hydroxide, the fluids typically gave high solder corrosion, whereas the fluids containing neutralized POC HS 2020 additive had acceptable corrosion properties. Similar observations were made with propylene glycol based fluids by admixing various additives with DOWFROST* HD (Table 7). Thus, fluids containing POC type additives generally have better properties overall in terms of thermal stability, corrosion properties, and resistance to water hardness than fluids known in the art containing polyacrylic acids. Furthermore, POC type additives do not significantly lower the pH of the system when added to the fluid.

TABLE 6

Corrosion Rate of Fluids by ASTM D1384 Test (mils penetration per year)

| FLUID | Cu | Solder | Brass | Steel | Cast Fe | Cast Al | pH |
|---|---|---|---|---|---|---|---|
| requirement | 0.4 | 1.2 | 0.4 | 0.4 | 0.4 | 1.2 | |
| DOWTHERM* SR1 | 0.12 | 0.14 | 0.11 | 0.03 | 0.13 | 0.44 | 9.36 |
| DOWTHERM* SR1 + 1,400 ppm | | | | | | | |
| Acumer 1000 | 0.04 | 0.04 | 0.02 | −0.19 | 0.35 | −0.62 | 8.35 |
| Good-Rite K-752 | 0.08 | 0.08 | 0.08 | −0.02 | 0.44 | −0.18 | 8.29 |
| POC HS 2020 | 0.10 | 0.31 | 0.06 | 0.02 | 0.79 | −0.50 | 8.20 |
| POC AS 2020 | 0.10 | 0.44 | 0.04 | 0.04 | 0.30 | −0.06 | 9.36 |
| DOWTHERM* SR1 + 1,000 ppm | | | | | | | |
| Good-Rite K-752 | | | | | | | |
| 50% neutralized-KOH | 0.05 | 4.80 | 0.10 | 0.02 | 0.40 | −1.1 | 8.67 |
| 90% neutralized-KOH | 0.05 | 8.65 | 0.10 | 0.05 | 0.40 | −0.15 | 9.34 |
| POC HS 2020 | | | | | | | |
| 50% neutralized-KOH | 0.05 | 0.80 | 0.10 | 0.02 | 0.20 | −0.60 | 8.41 |
| 90% neutralized-KOH | 0.05 | 0.80 | 0.10 | 0.02 | 0.35 | −0.40 | 9.34 |

TABLE 7

Corrosion Rate of Fluids by ASTM D1384 Test
(mils penetration per year)

| FLUID | Cu | Solder | Brass | Steel | Cast Fe | Cast Al | pH |
|---|---|---|---|---|---|---|---|
| requirement | 0.4 | 1.2 | 0.4 | 0.4 | 0.4 | 1.2 | |
| DOWFROST* HD | 0.02 | 0.05 | 0.04 | 0.05 | 0.04 | 0.04 | 10.06 |
| DOWFROST* HD + | | | | | | | |
| POC AS 2020 | 0.02 | 0.03 | 0.06 | 0.04 | 0.03 | 0.03 | 9.91 |
| POC HS 2020 | 0.02 | 0.29 | 0.06 | 0.04 | 0.03 | 0.02 | 8.88 |
| POC HS 2020-N | 0.02 | 0.08 | 0.02 | 0.02 | 0.03 | 0.05 | 9.43 |
| Acumer 1000 | 0.03 | 0.07 | 0.05 | 0.07 | 0.05 | 0.04 | 9.09 |
| Acumer 1000-N | 0.04 | 0.82 | 0.06 | 0.14 | 0.26 | 0.17 | 10.06 |
| Good-Rite K-752 | 0.05 | 0.70 | 0.16 | 0.08 | 0.07 | 0.05 | 9.01 |
| Good-Rite K-752-N | 0.04 | 1.37 | 0.07 | 0.23 | 0.44 | 0.11 | 10.34 |

What is claimed is:

1. A heat transfer fluid comprising:

a glycol;

at least about 1 weight percent of a phosphate; and at least about 0.01 weight percent of a copolymer comprising (a) an ethylenically substituted carboxylic acid or alkali metal salt thereof and (b) at least one aldehyde.

2. The heat transfer fluid of claim 1 wherein the copolymer is neutralized.

3. The heat transfer fluid of claim 1 wherein the molecular weight of the copolymer is less than about 5,000 grams/mole.

4. The heat transfer fluid of claim 1 wherein the molecular weight of the copolymer is greater than about 2,000 grams/mole.

5. The heat transfer fluid of claim 1 wherein the ethylenically substituted carboxylic acid comprises acrylic acid or methacrylic acid.

6. The heat transfer fluid of claim 1 wherein the alkali metal salt comprises sodium, or potassium.

7. The heat transfer fluid of claim 1 wherein the aldehyde comprises a C1–C6 aldehyde.

8. The heat transfer fluid of claim 1 wherein the aldehyde comprises acrolein.

9. The heat transfer fluid of claim 1 wherein the copolymer comprises a polyaldehydocarboxylic acid or an alkali metal salt thereof.

10. The heat transfer fluid of claim 1 further comprising a chelant.

11. The heat transfer fluid of claim 1 further comprising water.

12. The heat transfer fluid of claim 1 further comprising phosphonate.

13. A method for preparing a heat transfer fluid, the method comprises admixing:

92 to 96 weight percent of one or more glycols;

2 to 4 weight percent of a phosphate; and 0.01 to 0.25 weight percent of a copolymer of an ethylenically substituted carboxylic acid or alkali metal salt thereof and at least one aldehyde.

14. The method of claim 13 wherein the glycols are selected from the group consisting of: alkylene glycols, alkylene glycol monoethers, and alkylene glycol diethers.

15. The method of claim 13 further comprising the step of admixing the heat transfer fluid with water to form a mixture containing between about 40 and 75 weight percent water.

16. The method of claim 13 wherein the copolymer comprises a polyaldehydocarboxylic acid or an alkali metal salt thereof.

17. A method for inhibiting the precipitation of phosphates in a glycol-based composition when contacted with water, the method comprises adding about 100 to 2500 parts of a polymeric additive per million parts by weight of the glycol-based composition prior to contacting the glycol-based composition with water, the polymeric additive comprising a copolymer of an ethylenically substituted carboxylic acid or alkali metal salt thereof and at least one aldehyde.

18. The method of claim 17 wherein the method further comprises adding phosphonate prior to contacting the glycol-based composition with water.

19. The method of claim 17 wherein the copolymer has a molar ratio of ethylenically substituted carboxylic acid or alkali metal salt thereof to aldehyde of about 10:1 to 1:10.

* * * * *